(12) United States Patent
Forster et al.

(10) Patent No.: US 7,375,699 B2
(45) Date of Patent: *May 20, 2008

(54) WAVE ANTENNA WIRELESS COMMUNICATION DEVICE AND METHOD

(75) Inventors: Ian James Forster, Essex (GB); Peter Robert George Horrell, Essex (GB); Patrick F. King, Glen Ellyn, IL (US)

(73) Assignee: Mineral Lassen LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/637,326

(22) Filed: Aug. 8, 2003

(65) Prior Publication Data

US 2004/0041739 A1 Mar. 4, 2004

Related U.S. Application Data

(63) Continuation of application No. 10/012,206, filed on Oct. 29, 2001, now Pat. No. 6,630,910.

(51) Int. Cl.
*H01Q 1/36* (2006.01)

(52) U.S. Cl. ............... 343/806; 343/795; 343/895; 340/572.7

(58) Field of Classification Search ............. 343/713, 343/742, 795, 806, 828, 843, 867, 895, 741, 343/866; 340/572.1, 572.7, 572.8
See application file for complete search history.

(56) References Cited

U.S. PATENT DOCUMENTS 3,202,985 A 8/1965 Perkins et al.
3,508,274 A 4/1970 Kesler et al.

(Continued)

FOREIGN PATENT DOCUMENTS

DE 37 36 803 A1 11/1989

(Continued)

OTHER PUBLICATIONS

International Search Report, dated Apr. 11, 2003, for PCT/IB02/05095, filed Oct. 29, 2002.

(Continued)

*Primary Examiner*—Tho Phan
(74) *Attorney, Agent, or Firm*—Christensen O'Connor Johnson Kindness PLLC

(57) ABSTRACT

A wireless communication device coupled to a wave antenna that provides greater increased durability and impedance matching. The wave antenna is a conductor that is bent in alternating sections to form peaks and valleys. The wireless communication device is coupled to the wave antenna to provide wireless communication with other communication devices, such as an interrogation reader. The wireless communication device and wave antenna may be placed on objects, goods, or other articles of manufacture that are subject to forces such that the wave antenna may be stretched or compressed during the manufacture and/or use of such object, good or article of manufacture. The wave antenna, because of its bent structure, is capable of stretching and compressing more easily than other structures, reducing the wireless communication device's susceptibility to damage or breaks that might render the wireless communication device coupled to the wave antenna unable to properly communicate information wirelessly.

29 Claims, 11 Drawing Sheets

U.S. PATENT DOCUMENTS

| | | |
|---|---|---|
| 3,689,929 A | 9/1972 | Moody |
| 3,778,833 A | 12/1973 | Castrovillo et al. |
| 4,250,509 A | 2/1981 | Collins |
| 4,520,365 A | 5/1985 | Langheck |
| 4,529,961 A | 7/1985 | Nishimura et al. |
| 4,739,516 A | 4/1988 | Starkloff et al. |
| 4,864,322 A | 9/1989 | Yamamoto et al. |
| 4,866,456 A | 9/1989 | Ebey |
| 5,181,975 A | 1/1993 | Pollack et al. .......... 152/152.1 |
| 5,218,861 A | 6/1993 | Brown et al. .............. 73/146.5 |
| 5,274,393 A | 12/1993 | Scott |
| 5,319,354 A | 6/1994 | Myatt ......................... 340/572 |
| 5,347,280 A | 9/1994 | Schuermann ................ 342/42 |
| 5,479,171 A | 12/1995 | Schuermann ................ 342/44 |
| 5,554,242 A | 9/1996 | Brown et al. ............... 156/111 |
| 5,731,754 A | 3/1998 | Lee, Jr. et al. ............. 340/447 |
| 5,833,603 A | 11/1998 | Kovacs et al. .............. 600/317 |
| 5,926,107 A | 7/1999 | Glehr .................... 340/825.34 |
| 5,959,524 A | 9/1999 | Wienand et al. .............. 338/28 |
| 5,961,215 A | 10/1999 | Lee et al. .................... 374/178 |
| 5,972,156 A | 10/1999 | Brady et al. ................ 156/280 |
| 6,016,127 A | 1/2000 | Casiola et al. ............. 343/731 |
| 6,023,250 A | 2/2000 | Cronyn |
| 6,043,746 A | 3/2000 | Sorrells ................... 340/572.7 |
| 6,087,930 A | 7/2000 | Kulka et al. ................ 340/447 |
| 6,097,347 A | 8/2000 | Duan et al. |
| 6,100,804 A | 8/2000 | Brady et al. |
| 6,104,349 A | 8/2000 | Cohen |
| 6,127,989 A | 10/2000 | Kunz |
| 6,130,602 A | 10/2000 | OTool et al. ............ 340/10.33 |
| 6,140,974 A | 10/2000 | Dalley ........................ 343/806 |
| 6,140,975 A | 10/2000 | Cohen |
| 6,147,606 A | 11/2000 | Duan |
| 6,198,442 B1 | 3/2001 | Rutkowski et al. |
| 6,208,244 B1 | 3/2001 | Wilson et al. .............. 340/447 |
| 6,257,289 B1 | 7/2001 | Tomita et al. ........... 152/152.1 |
| 6,265,977 B1 | 7/2001 | Vega et al. |
| 6,272,936 B1 | 8/2001 | Oreper et al. .......... 73/862.621 |
| 6,278,413 B1 | 8/2001 | Hugh et al. ................. 343/818 |
| 6,281,794 B1 | 8/2001 | Duan |
| 6,285,342 B1 | 9/2001 | Brady et al. ................ 343/895 |
| 6,299,349 B1 | 10/2001 | Steinel et al. ............... 374/143 |
| 6,320,509 B1 | 11/2001 | Brady et al. |
| 6,320,545 B1 | 11/2001 | Nagumo et al. |
| 6,366,260 B1 | 4/2002 | Carrender |
| 6,388,567 B1 | 5/2002 | Bohm et al. ................ 340/442 |
| 6,405,064 B1 | 6/2002 | Endo et al. |
| 6,417,489 B1 | 7/2002 | Blankenship |
| 6,424,315 B1 | 7/2002 | Glenn et al. ................ 343/895 |
| 6,429,817 B1 | 8/2002 | Creigh et al. |
| 6,429,831 B2 | 8/2002 | Babb .......................... 343/895 |
| 6,448,942 B2 | 9/2002 | Weinberger et al. |
| 6,459,413 B1 | 10/2002 | Tseng et al. ................ 343/702 |
| 6,463,798 B2 | 10/2002 | Niekerk et al. ............ 73/146.2 |
| 6,474,380 B1 | 11/2002 | Rensel et al. ............ 152/152.1 |
| 6,480,110 B2 | 11/2002 | Lee et al. ................. 340/572.5 |
| 6,535,175 B2 | 3/2003 | Brady et al. |
| 6,630,885 B2 | 10/2003 | Hardman et al. |
| 6,630,910 B2 | 10/2003 | Forster et al. .............. 343/806 |
| 6,853,347 B2 | 2/2005 | Forster et al. |
| 6,856,285 B2 | 2/2005 | Bettin |
| 6,870,506 B2 | 3/2005 | Chen |
| 6,895,655 B2 | 5/2005 | Forster et al. |
| 6,899,153 B1 | 5/2005 | Pollack |
| 6,903,704 B2 | 6/2005 | Forster et al. |
| 6,999,028 B2 | 2/2006 | Egbert |
| 7,019,695 B2 | 3/2006 | Cohen |
| 7,050,017 B2 | 5/2006 | King |
| 7,116,213 B2 | 10/2006 | Thiesen |
| 7,256,751 B2 | 8/2007 | Cohen |
| 2001/0011964 A1 | 8/2001 | Sadler et al. |
| 2002/0066506 A1 | 6/2002 | Wilson ....................... 152/152 |
| 2002/0075145 A1 | 6/2002 | Hardman et al. ........... 340/442 |
| 2002/0088517 A1 | 7/2002 | Shimura .................. 152/152.1 |
| 2002/0093422 A1 | 7/2002 | Shimura ..................... 340/447 |
| 2002/0116992 A1 | 8/2002 | Rickel ......................... 73/146 |
| 2002/0126005 A1 | 9/2002 | Hardman et al. ........... 340/442 |
| 2002/0140574 A1 | 10/2002 | Starkey et al. ......... 340/870.16 |
| 2002/0190852 A1 | 12/2002 | Lin ............................ 340/445 |
| 2002/0190853 A1 | 12/2002 | Nigon et al. ................ 340/448 |
| 2003/0005760 A1 | 1/2003 | Bulst et al. ................... 73/146 |
| 2003/0117334 A1 | 6/2003 | Forster et al. |
| 2003/0132893 A1 | 7/2003 | Forster et al. |
| 2004/0017321 A1 | 1/2004 | Benedict et al. ............ 343/741 |
| 2004/0021559 A1 | 2/2004 | O'Brien |
| 2004/0032377 A1 | 2/2004 | Forster et al. |
| 2005/0193549 A1 | 9/2005 | Forster et al. |
| 2006/0279425 A1 | 12/2006 | Forster |

FOREIGN PATENT DOCUMENTS

| | | |
|---|---|---|
| DE | 100 30 402 A1 | 2/2001 |
| EP | 0 884 796 A2 | 12/1998 |
| EP | 1 177 597 A | 2/2002 |
| EP | 1037755 | 3/2002 |
| JP | 1-116899 U | 8/1989 |
| JP | 2-79602 A | 3/1990 |
| JP | 11-154819 A | 6/1999 |
| JP | 2001-525281 A | 12/2001 |
| JP | 2002-503047 A | 1/2002 |
| JP | 2002-64329 A | 2/2002 |
| JP | 2003-505962 A | 2/2003 |
| WO | 99/29522 A1 | 6/1999 |
| WO | WO 99/29525 A1 | 6/1999 |
| WO | 99/40647 A1 | 8/1999 |
| WO | WO 99/56345 A1 | 11/1999 |
| WO | WO 99/67851 | 12/1999 |
| WO | WO 00/69016 A1 | 11/2000 |
| WO | 01/08254 A1 | 2/2001 |
| WO | WO 02/07085 A1 | 1/2002 |
| WO | WO 03/038747 A2 | 5/2003 |
| WO | WO2004/070876 | 8/2004 |

OTHER PUBLICATIONS

International Search Report, dated Oct. 24, 2003, for PCT/IB03/02269, filed Apr. 22, 2003.

English translation of Japanese Patent Office Official Action dated Oct. 15, 2007, in Japanese Application No. 2004-567827.

WAVE ANTENNA WIRELESS COMMUNICATION DEVICE AND METHOD

CROSS REFERENCE TO RELATED APPLICATION

This application is a Continuation of application Ser. No. 10/012,206, filed Oct. 29, 2001, now U.S. Pat. No. 6,630, 910, issued Oct. 7, 2003.

FIELD OF THE INVENTION

The present invention relates to a wave antenna coupled to a wireless communication device so that the wireless communication device can wirelessly communicate information.

BACKGROUND OF THE INVENTION

Wireless communication devices are commonly used today to wirelessly communicate information about goods. For example, transponders may be attached to goods during their manufacture, transport and/or distribution to provide information, such as the good's identification number, expiration date, date of manufacture or "born on" date, lot number, and the like. The transponder allows this information to be obtained unobtrusively using wireless communication without slowing down the manufacturing, transportation, and/or distribution process.

Some goods involve environmental factors that are critical to their manufacture and/or intended operation. An example of such a good is a vehicle tire. It may be desirable to place a wireless communication device in a tire so that information regarding the tire, such as a tire's identification, pressure, temperature, and other environmental information, can be wirelessly communicated to an interrogation reader during the tire's manufacture and/or use.

Tire pressure monitoring may be particularly important since the pressure in a tire governs its proper operation and safety in use. For example, too little pressure in a tire during its use can cause a tire to be damaged by the weight of a vehicle supported by the tire. Too much pressure can cause a tire to rupture. Tire pressure must be tested during the manufacturing process to ensure that the tire meets intended design specifications. The tire pressure should also be within a certain pressure limits during use in order to avoid dangerous conditions. Knowledge of the tire pressure during the operation of a vehicle can be used to inform an operator and/or vehicle system that a tire has a dangerous pressure condition. The vehicle may indicate a pressure condition by generating an alarm or warning signal to the operator of the vehicle.

During the manufacturing process of a tire, the rubber material comprising the vehicle tire is violently stretched during its manufacture before taking final shape. Wireless communication devices placed inside tires during their manufacture must be able to withstand this stretching and compression and still be able to operate properly after the completion of the tire's manufacture. Since wireless communication devices are typically radio-frequency communication devices, an antenna must be coupled to the wireless communication device for communication. This antenna and wireless communication device combination may be placed in the inside of the tire along its inner wall or inside the rubber of tire for example. This results in stretching and compression of the wireless communication device and antenna whenever the tire is stretched and compressed. Often, the antenna is stretched and subsequently damaged or broken thereby either disconnecting the wireless communication device from an antenna or changing the length of the antenna, which changes the operating frequency of the antenna. In either case, the wireless communication device may be unable to communicate properly when the antenna is damaged or broken.

Therefore, an object of the present invention is to provide an antenna for a wireless communication device that can withstand a force, such as stretching or compression, and not be susceptible to damage or a break. In this manner, a high level of operability can be achieved with wireless communication devices coupled to antennas for applications where a force is placed on the antenna.

SUMMARY OF THE INVENTION

The present invention relates to a wave antenna that is coupled to a wireless communication device, such as a transponder, to wirelessly communicate information. The wave antenna is formed through a series of alternating bends in a substantially straight conductor, such as a wire, to form at least two different sections wherein at least one section of the conductor is bent at an angle of less than 180 degrees with respect to the other. A wave antenna is capable of stretching when subjected to a force without being damaged. A wave antenna can also provide improved impedance matching capability between the antenna and a wireless communication device because of the reactive interaction between different sections of the antenna conductor. In general, varying the characteristics of the conductor wire of the wave antenna, such as diameter, the angle of the bends, the lengths of the sections formed by the bends, and the type of conductor wire, will modify the cross coupling and, hence, the impedance of the wave antenna.

In a first wave antenna embodiment, a wireless communication device is coupled to a single conductor wave antenna to form a monopole wave antenna.

In a second wave antenna embodiment, a wireless communication device is coupled to two conductor wave antennas to form a dipole wave antenna.

In a third wave antenna embodiment, a dipole wave antenna is comprised out of conductors having different sections having different lengths. The first section is coupled to the wireless communication device and forms a first antenna having a first operating frequency. The second section is coupled to the first section and forms a second antenna having a second operating frequency. The wireless communication device is capable of communicating at each of these two frequencies formed by the first antenna and the second antenna.

In a fourth wave antenna embodiment, a resonating conductor is additionally coupled to the wireless communication device to provide a second antenna operating at a second operating frequency. The resonating ring may also act as a stress relief for force placed on the wave antenna so that such force is not placed on the wireless communication device.

In another embodiment, the wireless communication device is coupled to a wave antenna and is placed inside a tire so that information can be wirelessly communicated from the tire to an interrogation reader. The wave antenna is capable of stretching and compressing, without being damaged, as the tire is stretched and compressed during its manufacture and pressurization during use on a vehicle.

In another embodiment, the interrogation reader determines the pressure inside a tire by the response from a wireless communication device coupled to a wave antenna placed inside the tire. When the tire and, therefore, the wave antenna stretch to a certain length indicative that the tire is at a certain threshold pressure, the length of the antenna will be at the operating frequency of the interrogation reader so that the wireless communication device is capable of responding to the interrogation reader.

In another embodiment, a method of manufacture is disclosed on one method of manufacturing the wave antenna out of a straight conductor and attaching wireless communication devices to the wave antenna. The uncut string of wireless communication devices and wave antennas form one continuous strip that can be wound on a reel and later unwound, cut and applied to a good, object, or article of manufacture.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The present invention relates to a wave antenna that is coupled to a wireless communication device, such as a transponder, to wirelessly communicate information. The wave antenna is formed through a series of alternating bends in a substantially straight conductor, such as a wire, to form at least two different sections wherein at least one section of the conductor is bent at an angle of less than 180 degrees with respect to each other. A wave antenna is capable of stretching without being damaged when subjected to a force. A wave antenna can also provide improved impedance matching capability between the antenna and a wireless communication device because of the reactive interaction between different sections of the antenna conductor. In general, varying the characteristics of the conductor wire of the wave antenna, such as diameter, the angle of the bends, the lengths of the sections formed by the bends, and the type of conductor wire, will modify the cross coupling and, hence, the impedance of the wave antenna.

Before discussing the particular aspects and applications of the wave antenna as illustrated in FIGS. 2-10 of this application, a wireless communication system that may be used with the present invention is discussed below.

Figure 1:
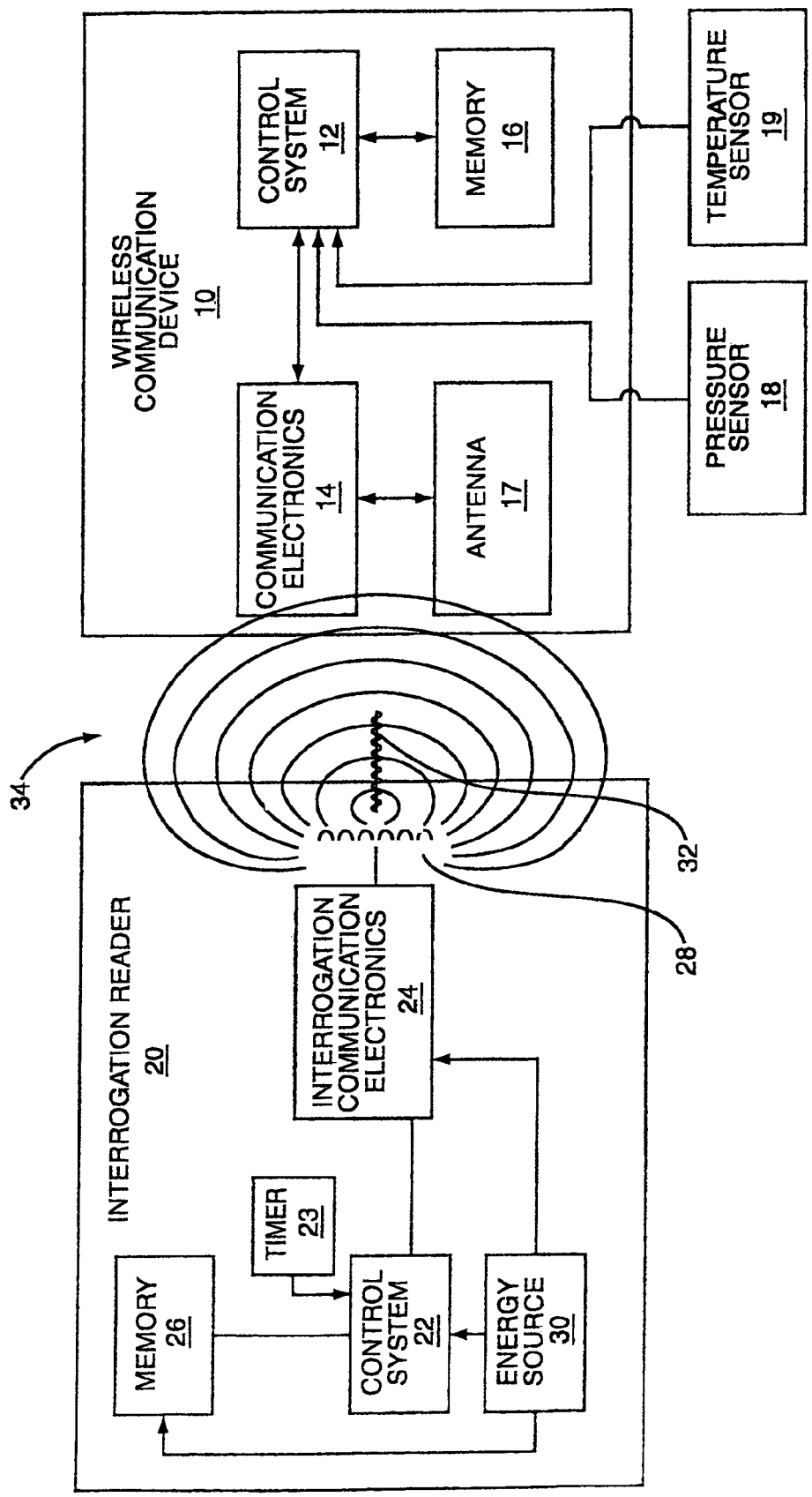
FIG. 1 is a schematic diagram of an interrogation reader and wireless communication device system that may be used with the present invention.

FIG. 1 illustrates a wireless communication device and communication system that may be used with the present invention. The wireless communication device 10 is capable of communicating information wirelessly and may include a control system 12, communication electronics 14, and memory 16. The wireless communication device 10 may also be known as a radio-frequency identification device (RFID). The communication electronics 14 is coupled to an antenna 17 for wirelessly communicating information in radio-frequency signals. The communication electronics 14 is capable of receiving modulated radio-frequency signals through the antenna 17 and demodulating these signals into information passed to the control system 12. The antenna 17 may be any type of antenna, including but not limited to a pole or slot antenna. The antenna 17 may be internal or external to the wireless communication device 10.

The control system 12 may be any type of circuitry or processor that receives and processes information received by the communication electronics 14, including a microcontroller or microprocessor. The wireless communication device 10 may also contain a memory 16 for storage of information. Such information may be any type of information about goods, objects, or articles of manufacture, including but not limited to identification, tracking, environmental information, such as pressure and temperature, and other pertinent information. The memory 16 may be electronic memory, such as random access memory (RAM), read-only memory (ROM), flash memory, diode, etc., or the memory 16 may be mechanical memory, such as a switch, dipswitch, etc.

The control system 12 may also be coupled to sensors that sense environmental information concerning the wireless communication device 10. For instance, the control system 12 may be coupled to a pressure sensor 18 to sense the pressure on the wireless communication device 10 and/or its surroundings. The control system 12 may also be coupled to a temperature sensor 19 to sense the temperature of the wireless communication device 10 or the ambient temperature around the wireless communication device 10. More information on different types of pressure sensors 18 that can be used to couple to the control system are disclosed in U.S. Pat. Nos. 6,299,349 and 6,272,936, entitled "Pressure and temperature sensor" and "Pressure sensor," respectively, both of which are incorporated herein by reference in their entirety.

The temperature sensor 19 may be contained within the wireless communication device 10, or external to the wireless communication device 10. The temperature sensor 19 may be any variety of temperature sensing elements, such as a thermistor or chemical device. One such temperature sensor 19 is described in U.S. Pat. No. 5,959,524, entitled "Temperature sensor," incorporated herein by reference in its entirety. The temperature sensor 19 may also be incorporated into the wireless communication device 10 or its control system 12, like that described in U.S. Pat. No. 5,961,215, entitled "Temperature sensor integral with microprocessor and methods of using same," incorporated herein by reference in its entirety. However, note that the present invention is not limited to any particular type of temperature sensor 19.

Some wireless communication devices 10 are termed "active" devices in that they receive and transmit data using their own energy source coupled to the wireless communication device 10. A wireless communication device 10 may use a battery for power as described in U.S. Pat. No. 6,130,602 entitled "Radio frequency data communications device," or may use other forms of energy, such as a capacitor as described in U.S. Pat. No. 5,833,603, entitled "Implantable biosensing transponder." Both of the preceding patents are incorporated herein by reference in their entirety.

Other wireless communication devices 10 are termed "passive" devices meaning that they do not actively transmit and therefore may not include their own energy source for power. One type of passive wireless communication device 10 is known as a "transponder." A transponder effectively transmits information by reflecting back a received signal from an external communication device, such as an interrogation reader. An example of a transponder is disclosed in U.S. Pat. No. 5,347,280, entitled "Frequency diversity transponder arrangement," incorporated herein by reference in its entirety. Another example of a transponder is described in co-pending patent application Ser. No. 09/678,271, entitled "Wireless communication device and method," incorporated herein by reference in its entirety.

FIG. 1 depicts communication between a wireless communication device 10 and an interrogation reader 20. The interrogation reader 20 may include a control system 22, an interrogation communication electronics 24, memory 26, and an interrogation antenna 28. The interrogation antenna 28 may be any type of antenna, including a pole antenna or a slot antenna. The interrogation reader 20 may also contain its own internal energy source 30, or the interrogation reader 20 may be powered through an external power source. The energy source 30 may include batteries, a capacitor, solar cell or other medium that contains energy. The energy source 30 may also be rechargeable. A timer 23 may also be coupled to the control system 22 for performing tasks that require timing operations.

The interrogation reader 20 communicates with the wireless communication device 10 by emitting an electronic signal 32 modulated by the interrogation communication electronics 24 through the interrogation antenna 28. The interrogation antenna 28 may be any type of antenna that can radiate a signal 32 through a field 34 so that a reception device, such as a wireless communication device 10, can receive such signal 32 through its own antenna 17. The field 34 may be electromagnetic, magnetic, or electric. The signal 32 may be a message containing information and/or a specific request for the wireless communication device 10 to perform a task or communicate back information. When the antenna 17 is in the presence of the field 34 emitted by the interrogation reader 20, the communication electronics 14 are energized by the energy in the signal 32, thereby energizing the wireless communication device 10. The wireless communication device 10 remains energized so long as its antenna 17 is in the field 34 of the interrogation reader 20. The communication electronics 14 demodulates the signal 32 and sends the message containing information and/or request to the control system 12 for appropriate actions.

It is readily understood to one of ordinary skill in the art that there are many other types of wireless communications devices and communication techniques than those described herein, and the present invention is not limited to a particular type of wireless communication device, technique or method.

Figure 2A:
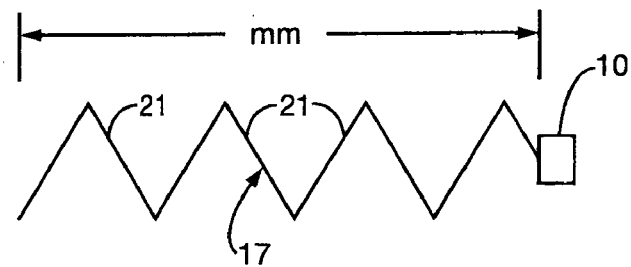
FIG. 2A is a schematic diagram of a monopole wave antenna coupled to a wireless communication device for wireless communications.

FIG. 2A illustrates a first embodiment of a wave antenna 17 coupled to a wireless communication device 10 for wireless communication. This embodiment illustrates a monopole wave antenna 17. The wave antenna 17 is formed by a conducting material, such as a wire or foil for example, that is bent in alternating sections to form a series of peaks and valleys. Any type of material can be used to form the wave antenna 17 so long as the material can conduct, electrical energy. A wave antenna 17 in its broadest form is a conductor that is bent in at least one position at an angle less than 180 degrees to form at least two different sections 21. The monopole wave antenna 17 in this embodiment contains seven alternating bends to form a saw-tooth wave shape. The monopole wave antenna 17 is coupled, by either a direct or reactive coupling, to an input port (not shown) on the wireless communication device 10 to provide an antenna 17 for wireless communications. Since the wireless communication device 10 contains another input port that is coupled to the monopole wave antenna 17, this additional input port is grounded.

A wave antenna 17 may be particularly advantageous to use with a wireless communication device 10 in lieu of a straight antenna. One advantage of a wave antenna 17 is that it is tolerant to stretching without substantial risk of damage or breakage to the conductor. Certain types of goods, objects, or articles of manufacture may encounter a force, such as stretching or compression, during their manufacture and/or normal use. If a wireless communication device 10 uses a straight conductor as antenna 17 and is attached to goods, objects, or articles of manufacture that are subjected to a force during their manufacture or use, the antenna 17 may be damaged or broken when the good, object or article of manufacture is subjected to such force. If the antenna 17 is damaged or broken, this may cause the wireless communication device 10 to be incapable of wireless communication since a change in the length or shape of the conductor in the antenna 17 may change the operating frequency of the antenna 17.

A wave antenna 17, because of its bent sections 21, also causes the field emitted by the conductors in sections 21 to capacitively couple to other sections 21 of the wave antenna 17. This results in improved impedance matching with the wireless communication device 10 to provide greater and more efficient energy transfer between the wireless communication device 10 and the wave antenna 17. As is well known to one of ordinary skill in the art, the most efficient energy transfer occurs between a wireless communication device 10 and an antenna 17 when the impedance of the antenna 17 is the complex conjugate of the impedance of the wireless communication device 10.

The impedance of a straight conductor antenna 17 is dependant on the type, size, and shape of the conductor. The length of the antenna 17 is the primary variable that determines the operating frequency of the antenna 17. Unlike a straight conductor antenna 17, a wave antenna 17 can also be varied in other ways not possible in a straight conductor antenna 17. In a wave antenna 17, other variables exist in the design of the antenna in addition to the type, size, shape and length of the conductor. The impedance of a wave antenna 17 can also be varied by varying the length of the individual sections 21 of the conductor making up the wave antenna 17 and the angle between these individual sections 21 in addition to the traditional variables available in straight conductor antennas 17. These additional variables available in wave antennas 17 can be varied while maintaining the overall length of the conductor so that the operating frequency of the wave antenna 17 is maintained. In this embodiment, the lengths of the individual sections 21 and the angles between the individual sections 21 are the same; however, they do not have to be.

In summary, a wave antenna 17 provides the ability to alter and select additional variables not possible in straight conductor antennas 17 that affect the impedance of the antenna 17, thereby creating a greater likelihood that a wave antenna's 17 impedance can be designed to more closely match the impedance of the wireless communication device 10. Of course, as is well known by one of ordinary skill in the art, the type of materials attached to the wave antenna 17 and the material's dielectric properties also vary the impedance and operating frequency of the wave antenna 17. These additional variables should also be taken into account in the final design of the wave antenna 17. The reactive cross-coupling that occurs between different sections 21 of the wave antenna 17 also contribute to greater impedance matching capability of the wave antenna 17 to a wireless communication device 10. More information on impedance matching between a wireless communication device 10 and an antenna 17 for efficient transfer of energy is disclosed in U.S. pending patent application Ser. No. 09/536,334, entitled "Remote communication using slot antenna," incorporated herein by reference in its entirety.

Figure 2B:
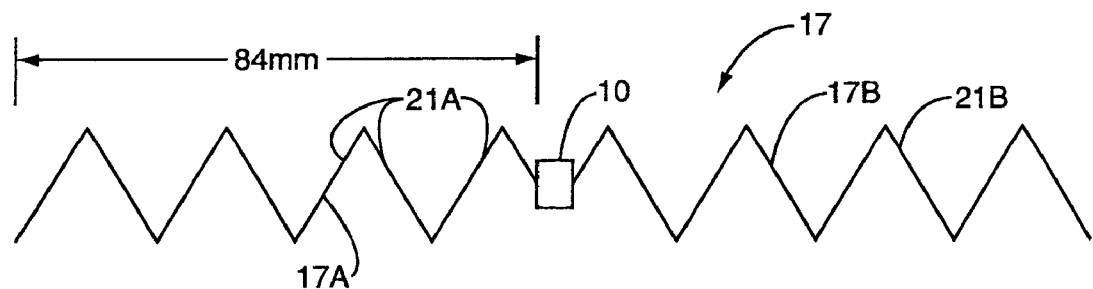
FIG. 2B is a schematic diagram of a dipole wave antenna coupled to a wireless communication device for wireless communications.

FIG. 2B illustrates a wave antenna 17 similar to that illustrated in FIG. 2A; however, the wave antenna in FIG. 2B is a dipole wave antenna 17. Two conductors 17A, 17B are coupled to the wireless communication device 10 to provide wireless communications. In this embodiment, the length of the conductors 17A, 17B that form the dipole wave antenna 17 are each 84 millimeters in length. The dipole wave antenna 17 operates at a frequency of 915 MHz. In this embodiment, the lengths of the individual sections 21 and the angles between the individual sections 21 that make up the dipole wave antenna 17 are the same; however, they do not have to be.

Figure 3:
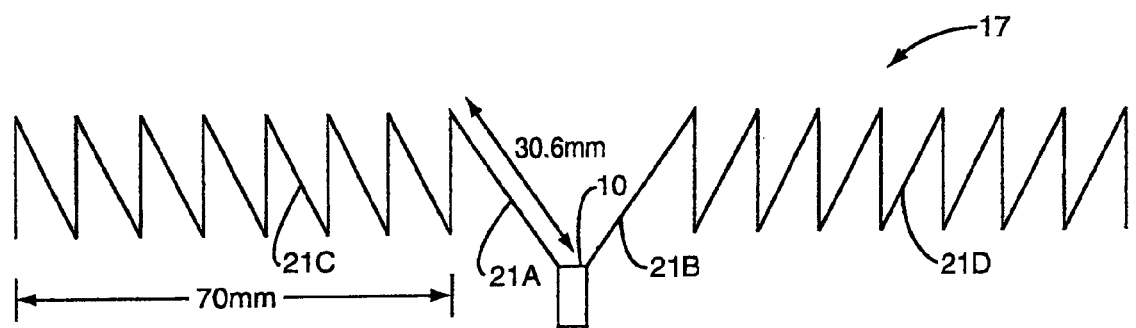
FIG. 3 is a schematic diagram of a dipole wave antenna coupled to a wireless communication device wherein a first portion of the wave antenna operates at a first frequency and a second portion of the wave antenna coupled to the first portion operates at a second frequency.

FIG. 3 illustrates another embodiment of a wave antenna 17 where the lengths of the individual sections 21 and the angle between the individual sections 21 are not the same. Two conductors are coupled to the wireless communication device 10 to create a dipole wave antenna 17. The first conductor is comprised out of two sections 21A, 21C, each having a different number of sections 21 and lengths. The two sections 21A, 21C are also symmetrically contained in the second conductor 21B, 21D. This causes the wave antenna 17 to act as a dipole antenna that resonates and receives signals at two different operating frequencies so that the wireless communication device 10 is capable of communicating at two different frequencies.

The first symmetrical sections 21A, 21B are 30.6 millimeters or $\lambda/4$ in length and are coupled to the wireless communication device 10 so that the wave antenna 17 is capable of receiving 2.45 GHz signals. The second symmetrical sections 21C, 21D are coupled to the first sections 21A, 21B, respectively, to form a second dipole antenna for receiving signals at a second frequency. In this embodiment, the second sections 21C, 21D are 70 millimeters in length and are coupled to the first sections 21A, 21B, respectively, to form lengths that are designed to receive 915 MHz signals. Also note that bends in the conductor in the wave antenna 17 are not constant. The bends in the wave antenna 17 that are made upward are made at an angle of less than 180 degrees. The bends in the wave antenna 17 that are made downward are made at an angle of 180 degrees.

Note that it is permissible for bends in sections 21 of the conductor to be 180 degrees so long as all of the sections 21 in the conductor are not bent at 180 degrees with respect to adjacent sections 21. If all of the sections 21 in the conductor are bent at 180 degrees, then the conductor will effectively be a straight conductor antenna 17 and not a wave antenna 17.

Figure 4A:
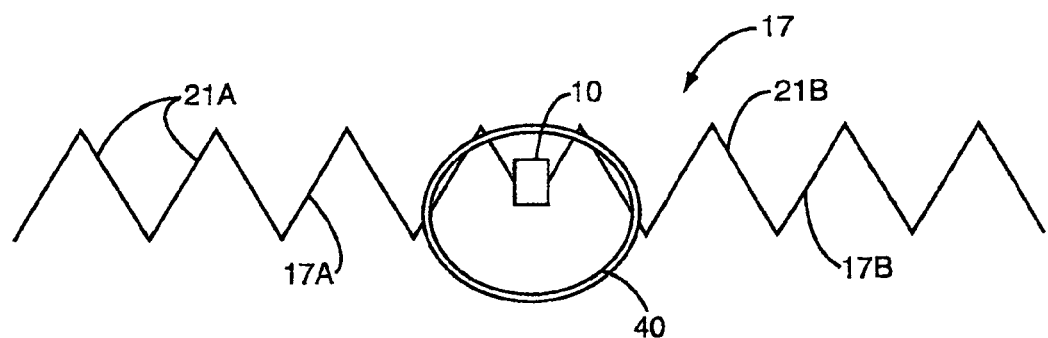
FIG. 4A is a schematic diagram of a wave antenna and a ring resonator both coupled to a wireless communication device wherein the wave antenna operates at a first frequency and the ring resonator operates at a second frequency.

FIG. 4A illustrates another embodiment of the wave antenna 17 coupled to the wireless communication device 10 wherein the wireless communication device 10 is configured to receive signals at two different frequencies. A wave antenna 17 similar the wave antenna 17 illustrated in FIG. 2B is coupled to the wireless communication device 10 to form a dipole wave antenna 17. A resonating ring 40 is also capacitively coupled to the wireless communication device 10 to provide a second antenna 17 that operates at a second and different frequency from the operating frequency of the dipole wave antenna 17. The resonating ring 40 may be constructed out of any type of material so long as the material is conductive.

This embodiment may be particularly advantageous if it is necessary for the wireless communication device 10 to be capable of wirelessly communicating regardless of the force, such as stretching or compression, exerted on the wave antenna 17. The resonating ring 40 is designed to remain in its original shape regardless of the application of any force that may be placed on the wireless communication device 10 or a good, object, or article of manufacture that contains the wireless communication device 10. Depending on the force exerted on the wave antenna 17 or a good, object or article of manufacture that contains the wave antenna 17 and wireless communication device 10, the length of the wave antenna 17 may change, thereby changing the operating frequency of the wave antenna 17. The new operating frequency of the wave antenna 17 may be sufficiently different from the normal operating frequency such that wave antenna 17 and the wireless communication device 10 could not receive and/or demodulate signals sent by the interrogation reader 20. The resonating ring 40 is capable of receiving signals 32 regardless of the state of the wave antenna 17.

Figure 4B:
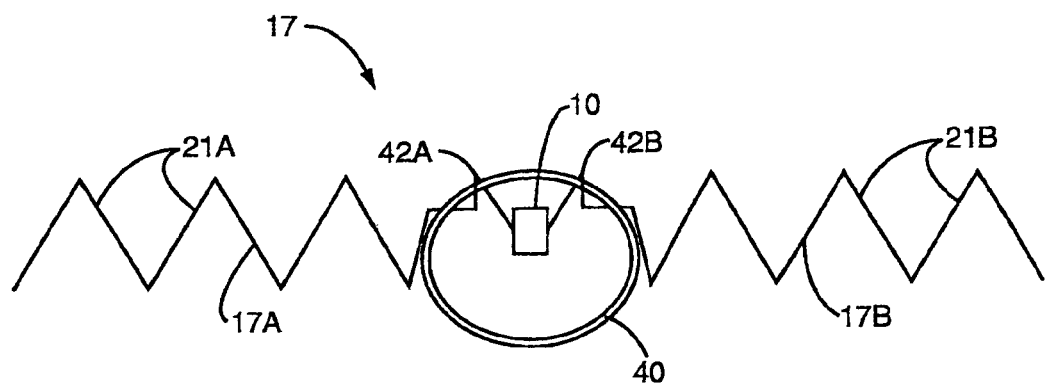
FIG. 4B is a schematic diagram of the wave antenna and a ring resonator as illustrated in FIG. 4A, except that the ring resonator is additionally mechanically coupled to the wave antenna as a mechanical stress relief.

FIG. 4B also illustrates an embodiment of the present invention employing a dipole wave antenna 17 that operates at 915 MHz and a resonating ring 40 that operates at 2.45 GHz. The dipole wave antenna 17 and the resonating ring 40 are both coupled to the wireless communication device 10 to allow the wireless communication device 10 to operate at two different frequencies. However, in this embodiment, the conductors of the dipole wave antenna 17 are looped around the resonating ring 40 at a first inductive turn 42A and a second inductive turn 42B. In this manner, any force placed on the dipole wave antenna 17 will place such force on the resonating ring 40 instead of the wireless communication device 10.

This embodiment may be advantageous in cases where a force, placed on the dipole wave antenna 17 without providing a relief mechanism other than the wireless communication device 10 itself would possibly cause the dipole wave antenna 17 to disconnect from the wireless communication device 10, thus causing the wireless communication device 10 to be unable to wirelessly communicate. The resonating ring 40 may be constructed out of a stronger material than the connecting point between the dipole wave antenna 17 and the wireless communication device 10, thereby providing the ability to absorb any force placed on the dipole wave antenna 17 without damaging the resonating ring 40. This embodiment may also be particularly advantageous if the wireless communication device 10 is placed on a good, object or article of manufacture that undergoes force during its manufacture or use, such as a rubber tire, for example.

Figure 4C:
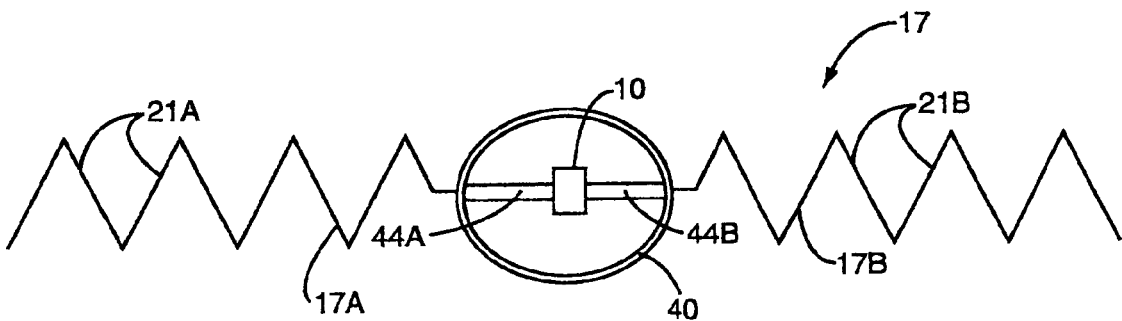
FIG. 4C is a schematic diagram of an alternative embodiment to FIG. 4B.

FIG. 4C illustrates another embodiment similar to those illustrated in FIGS. 4A and 4B. However, the resonating ring 40 is directly coupled to the wireless communication device 10, and the dipole wave antenna 17 is directly coupled to the resonating ring 10. A first and second conducting attachments 44A, 44B are used to couple the resonating ring 40 to the wireless communication device 10. A force exerted on the dipole wave antenna 17 is exerted on and absorbed by the resonating ring 40 rather than wireless communication device 10 so that the wireless communication device 10 is not damaged.

Figure 5A:
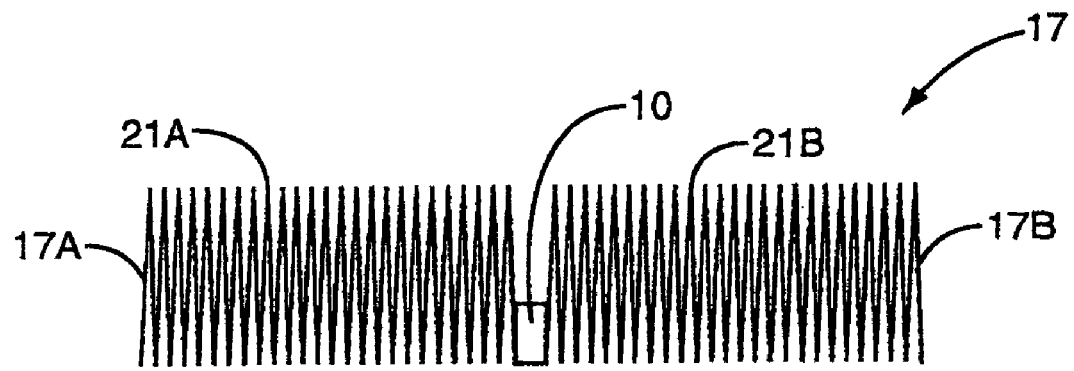
FIG. 5A is a schematic diagram of another embodiment of a wave antenna and wireless communication device.

FIG. 5A illustrates another embodiment of the wave antenna 17 that is stretched wherein the bending are at angles close to 180 degrees, but slightly less, to form sections 21 close to each other. The coupling between the individual elements in the wave antenna 17 will be strong due to the proximity. Therefore, a small change in stretching of the wave antenna 17 will have a large effect on the operating frequency of the wave antenna 17. Since the change in the operating frequency will be great, it will be easier for a small stretching of the wave antenna 17 to change the operating frequency of the wave antenna 17.

Figure 5B:
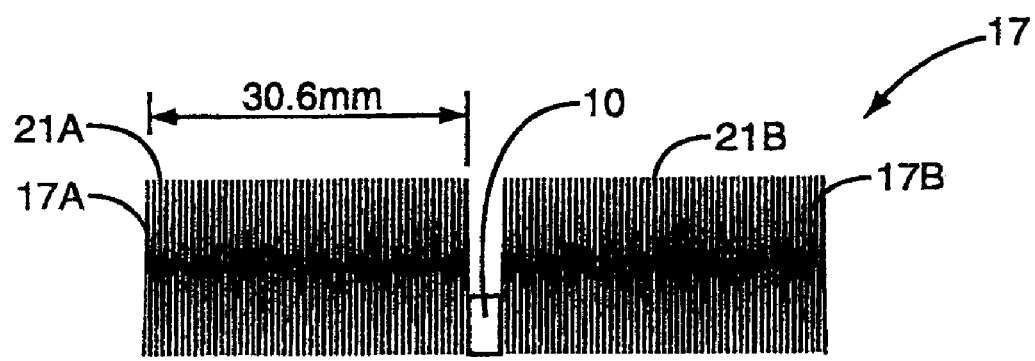
FIG. 5B is a schematic diagram of a compressed version of the wave antenna illustrated in FIG. 5A.

FIG. 5B illustrates the same wave antenna 17 and wireless communication device 10 illustrated in FIG. 5A; however, the wave antenna 17 is not being stretched. When this wave antenna 17 is not being stretched, the bent sections in the wave antenna 17 touch each other to effectively act as a regular dipole antenna without angled sections 21. If this embodiment, each pole 17A, 17B of the wave antenna 17 in its normal form is 30.6 millimeters long and has an operating frequency of 2.45 GHz such that the wireless communication device 10 is capable of responding to a frequency of 2.45 GHz.

Figure 6A:
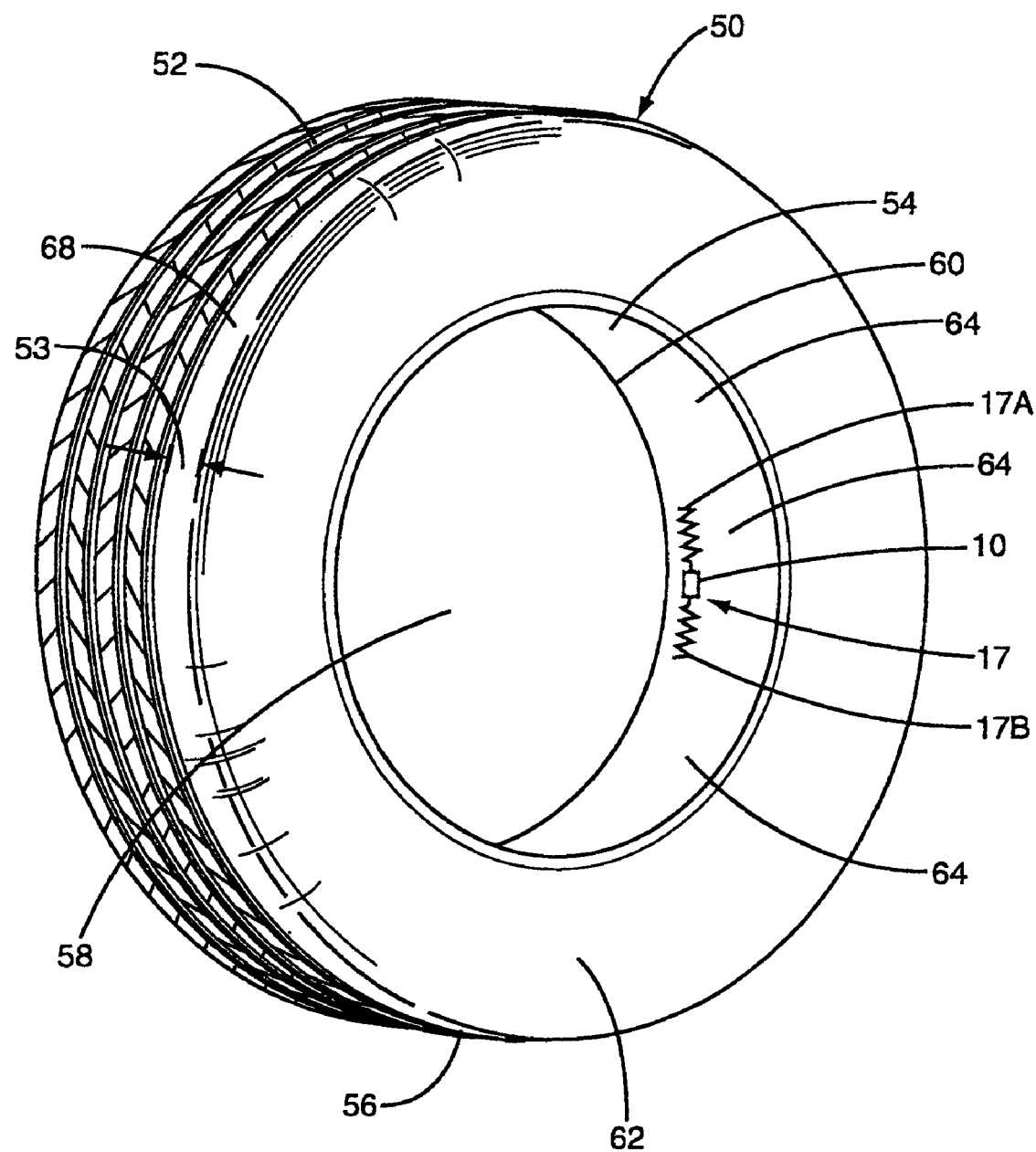
FIG. 6A is a schematic diagram of a wireless communication device and wave antenna attached to the inside of a tire for wireless communication of information about the tire.

FIG. 6A illustrates one type of article of manufacture that undergoes force during its manufacture and use and that may include a wireless communication device 10 and wave antenna 17 like that illustrated in FIGS. 5A and 5B. This embodiment includes a rubber tire 50 well known in the prior art that is used on transportation vehicles. The tire 50 is designed to be pressurized with air when placed inside a tire 50 mounted on a vehicle wheel forming a seal between the wheel and the tire 50. The tire 50 is comprised of a tread surface 52 that has a certain defined thickness 53. The tread surface 52 has a left outer side 54, a right outer side 56 and an orifice 58 in the center where the tire 50 is designed to fit on a wheel. The left outer side 54 and right outer side 56 are bent downward at angles substantially perpendicular to the plane of the tread surface 52 to form a left outer wall 60 and a right outer wall 62. When the left outer wall 60 and right outer wall 62 are formed, a left inner wall 64 and a right inner wall 66 are also formed as well. Additionally, depending on the type of tire 50, a steel belt 68 may also be included inside the rubber of the tire 50 under the surface of the tread surface 52 for increase performance and life. More information on the construction and design of a typical tire 50 is disclosed in U.S. Pat. No. 5,554,242, entitled "Method for making a multi-component tire," incorporated herein by reference in its entirety.

In this embodiment, a wireless communication device 10 and dipole wave antenna 17 are attached on the inner surface of the tire 50 on the other side of the tread surface 52. During the manufacturing of a tire 50, the rubber in the tire 50 undergoes a lamination process whereby the tire 50 may be stretched up to approximately 1.6 times its normal size and then shrunk back down to the normal dimensions of a wheel. If a wireless communication device 10 is placed inside the tire 50 during the manufacturing process, the wireless communication device 10 and antenna 17 must be able to withstand the stretching and shrinking that a tire 50 undergoes without being damaged. The wave antenna 17 of the present invention is particularly suited for this application since the wave antenna 17 can stretch and compress without damaging the conductor of the wave antenna 17.

Also, a tire 50 is inflated with gas, such as air, to a pressure during its normal operation. If the wireless communication device 10 and antenna 17 are placed inside the tread surface 52 or inside the tire 50, the wireless communication device 10 and antenna 17 will stretch and compress depending on the pressure level in the tire 50. The more pressure contained in the tire 50, the more the tire 50 will stretch. Therefore, any wireless communication device 10 and antenna 17 that is contained inside the tire 50 or inside the rubber of the tire 50 must be able to withstand this stretching without being damaged and/or affecting the proper operation of the wireless communication device 10.

Figure 6B:
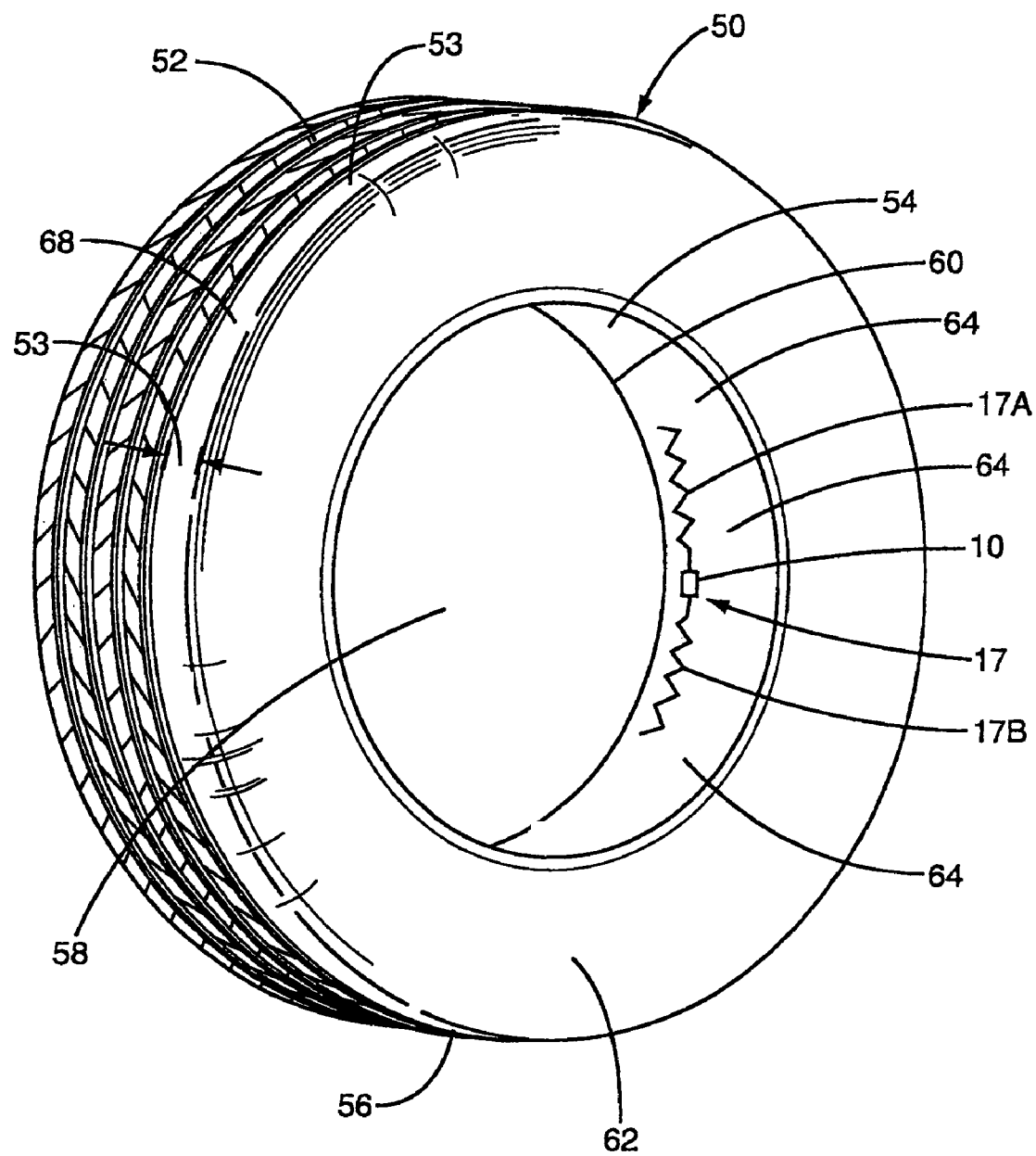
FIG. 6B is a schematic diagram of FIG. 6A, except that the tire is under pressure and is stretching the wave antenna.

FIG. 6B illustrates the same tire illustrated in FIG. 6A. However, in this embodiment, the tire 50 is under a pressure and has stretched the dipole wave antenna 17. Because the dipole wave antenna 17 is capable of stretching without being damaged or broken, the dipole wave antenna 17 is not damaged and does not break when the tire 50 is stretched when subjected to a pressure. Note that the wave antenna 17 placed inside the tire 50 could also be a monopole wave antenna 17, as illustrated in FIG. 2A, or any other variation of the wave antenna 17, including the wave antennas 17 illustrated in FIGS. 2B, 3, 4A-4C, 5A, and 5B. Also, note that the wireless communication device 10 and wave antenna 17 could be provided anywhere on the inside of the tire 50, including inside the thickness 53 of the tread surface 52, the left inner wall 64 or the right inner wall 66.

Figure 7:
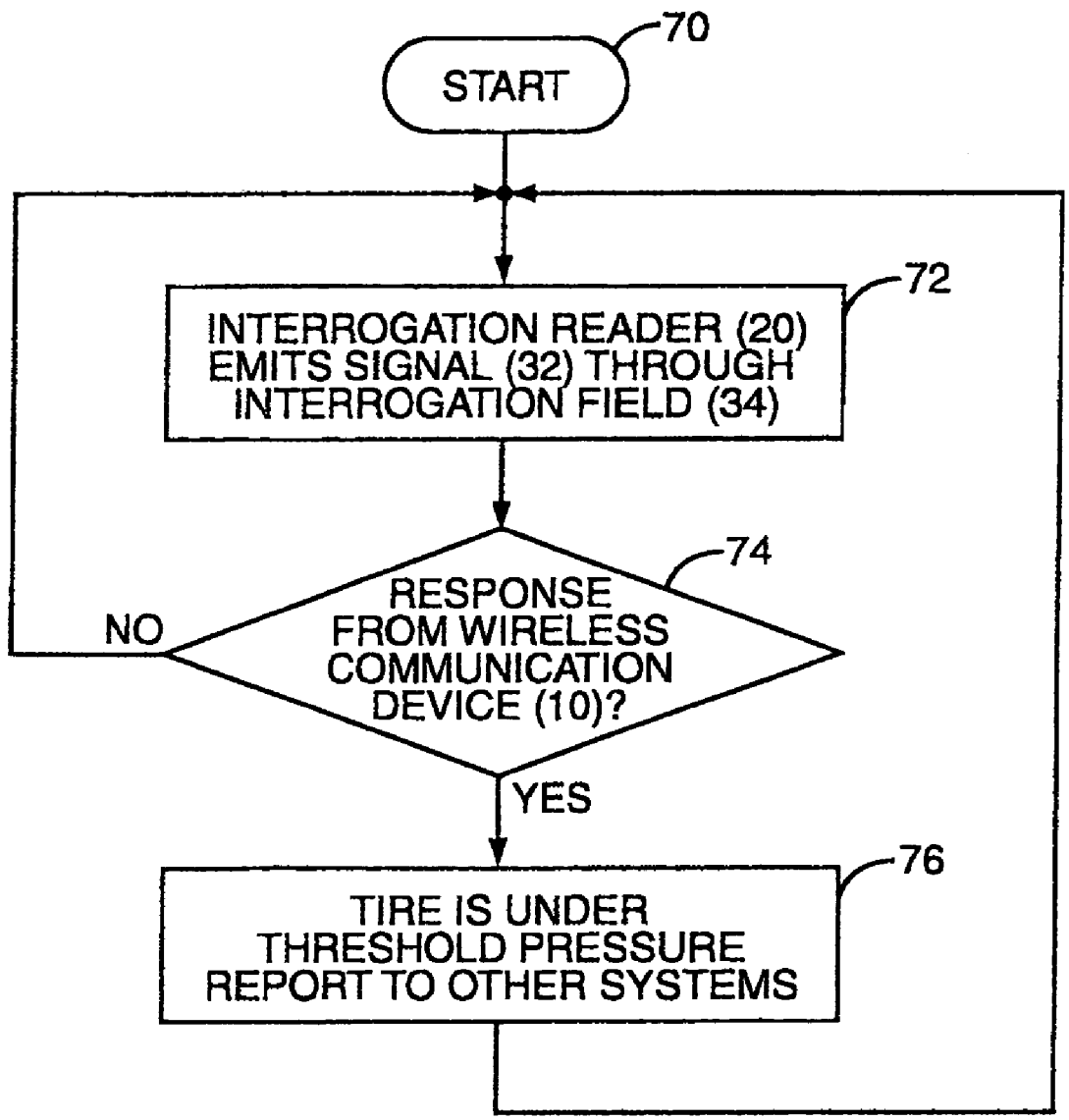
FIG. 7 is a flowchart diagram of a tire pressure detection system executed by an interrogation reader by communicating with a wireless communication device coupled to a wave antenna inside a tire like that illustrated in FIGS. 6A and 6B.

FIG. 7 illustrates a flowchart process wherein the interrogation reader 20 is designed to communicate with the wireless communication device 10 and wave antenna 17 to determine when the pressure of the tire 50 has reached a certain designed threshold pressure. Because a wave antenna 17 changes length based on the force exerted on its conductors, a wave antenna 17 will stretch if placed inside a tire 50 as the pressure inside the tire 50 rises. The wave antenna 17 can be designed so that the length of the wave antenna 17 only reaches a certain designed length to be capable of receiving signals at the operating frequency of the interrogation reader 20 when the tire 50 reaches a certain threshold pressure.

The process starts (block 70), and the interrogation reader 20 emits a signal 32 through the field 34 as discussed previously for operation of the interrogation reader 20 and wireless communication device 10 illustrated in FIG. 1. The interrogation reader 20 checks to see if a response signal has been received from the wireless communication device 10 (decision 74). If no response signal is received by the interrogation reader 20 from the wireless communication device 10, the interrogation reader 20 continues to emit the signal 34 in a looping fashion (block 72) until a response is received. Once a response is received by the interrogation reader 20 from the wireless communication device 10 (decision 74), this is indicative of the fact that the wave antenna 17 coupled to the wireless communication device 10 has stretched to a certain length so that the wave antenna's 17 operating frequency is compatible with the operating frequency of the interrogation reader 20 (block 76). The interrogation reader 20 can report that the tire 50 containing the wireless communication device 10 and wave antenna 17 has reached a certain threshold pressure. Note that the wave antennas 17 may be any of the wave antennas 17 illustrated in FIGS. 2B, 3, 4A-4C, 5A, and 5B.

Figure 8:
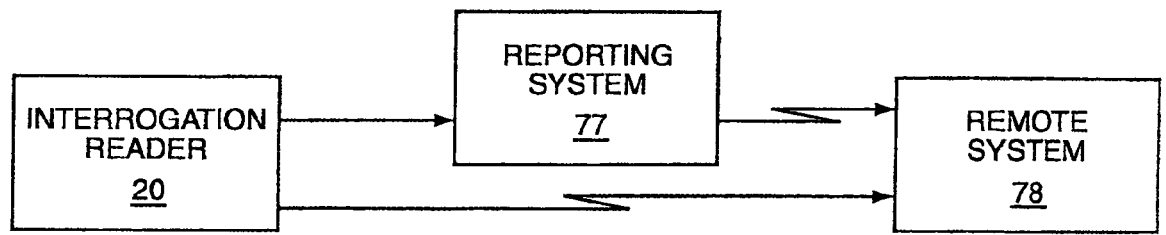
FIG. 8 is a schematic diagram of a reporting system for information wirelessly communicated from a tire to an interrogation reader.

FIG. 8 illustrates one embodiment of a reporting system that may be provided for the interrogation reader 20. The interrogation reader 20 may be coupled to a reporting system 77. This reporting system 77 may be located in close proximity to the interrogation reader 20, and may be coupled to the interrogation reader 20 by either a wired or wireless connection. The reporting system 77 may be a user interface or other computer system that is capable of receiving and/or storing data communications received from an interrogation reader 20. This information may be any type of information received from a wireless communication device 10, including but not limited to identification information, tracking information, and/or environmental information concerning the wireless communication device 10 and/or its surroundings, such as pressure and temperature. The information may be used for any purpose. For example, identification, tracking, force and/or pressure information concerning a tire 50 during its manufacture may be communicated to the reporting system 77 which may then be used for tracking, quality control, and supply-chain management. If the information received by the reporting system is not normal or proper, the reporting system 77 may control the manufacturing operations to stop and/or change processes during manufacture and/or alert personnel in charge of the manufacturing process.

The reporting system 77 may also communicate information received from the wireless communication device 10, via the interrogation reader 20, to a remote system 78 located remotely from the reporting system 77 and/or the interrogation reader 20. The communication between the reporting system 77 and the remote system 78 may be through wired communication, wireless communication, modem communication or other networking communication, such as the Internet. Alternatively, the interrogation reader 20 may communicate the information received from the wireless communication device 10 directly to the remote system 78 rather than first reporting the information through the reporting system 77 using the same or similar communication mediums as may be used between the reporting system 77 and the remote system 78.

Figure 9:
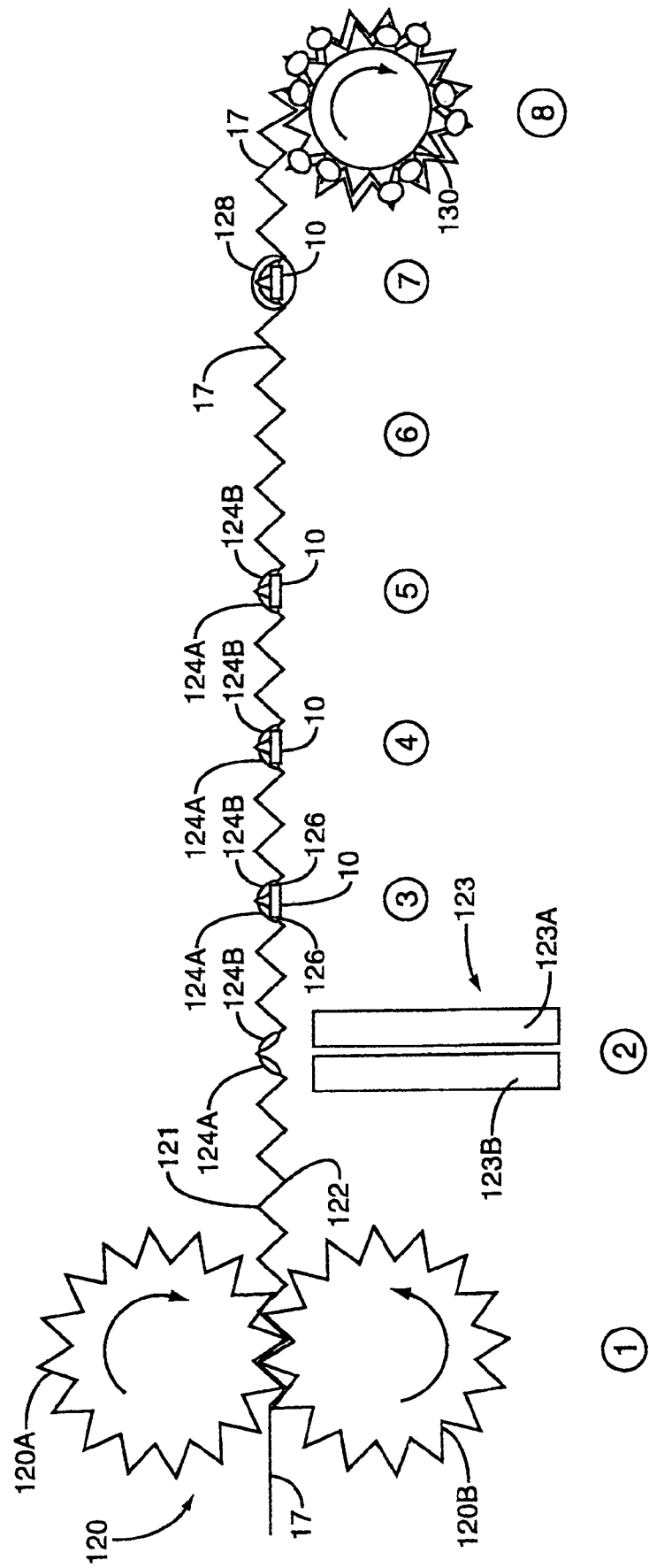
FIG. 9 is a schematic diagram of a process of manufacturing a wave antenna and coupling the wave antenna to a wireless communication device.

FIG. 9 illustrates a method of manufacturing a wave antenna 17 and assembly of the wave antenna 17 to wireless communication devices 10. The process involves eight total steps. Each of the steps is labeled in circled numbers illustrated in FIG. 9. The first step of the process involves passing an antenna 17 conductor wire or foil through cogs 120 to create the alternating bends in the antenna conductor 17 to form the wave antenna 17. The cogs 120 are comprised of a top cog 120A and a bottom cog 120B. The top cog 120A rotates clockwise, and the bottom cog 120B rotates counterclockwise. Each cog 120A, 120B includes teeth that interlock with each other as the cogs 120A, 120B rotate. As the antenna conductor 17 passes through the cogs 120A, 120B, alternating bends are placed in the antenna conductor 17 to form peaks 121 and valleys 122 in the antenna conductor 17 to form the wave antenna 17.

The second step of the process involves placing tin solder on portions of the wave antenna 17 so that a wireless communication device 10 can be soldered and attached to the wave antenna 17 in a later step. A soldering station 123 is provided and is comprised of a first tinning position 123A and a second tinning position 123B. For every predefined portion of the wave antenna 17 that passes by the soldering station 123, the first tinning position 123A and second tinning position 123B raise upward to place tin solder on the left side of the peak 124A and an adjacent right side of the peak 124A so that the wireless communication device 10 can be soldered to the wave antenna 17 in the third step of the process. Please note that the process may also use glue instead of solder to attach the wireless communication device 10 to the wave antenna 17.

The third step of the process involves attaching a wireless communication device 10 to the wave antenna 17. A wireless communication device is attached to the left side of the peak 124A and the right side of the peak 124B at the points of the tin solder. An adhesive 126 is used to attach the leads or pins (not shown) of the wireless communication device 10 to the tin solder, and solder paste is added to the points where the wireless communication device 10 attach to the tin solder on the wave antenna 17 to conductively attach the wireless communication device 10 to the wave antenna 17. Note that when the wireless communication device 10 is attached to the wave antenna 17, the peak remains on the wireless communication device 10 that causes a short 128 between the two input ports (not shown) of the wireless communication device 10 and the two wave antennas 17 coupled to the wireless communication device 10.

The fourth step in the process involves passing the wireless communication device 10 as connected to the wave antenna 17 through a hot gas re-flow soldering process well known to one of ordinary skill in the art to securely attach the solder between the leads of the wireless communication device 10 and the wave antenna 17.

The fifth step in the process involves the well-known process of cleaning away any excess solder that is unused and left over during the previous soldering.

The sixth step in the process involves removing the short 128 between the two wave antennas 17 left by the peak 124 of the wave antenna 17 from the third step in the process. Depending on the type of wireless communication device 10 and its design, the short 128 may or may not cause the wireless communication device 10 to not properly operate to receive signals and re-modulate response signals. If the wireless communication device 10 operation is not affected by this short 128, this step can be skipped in the process.

The seventh step in the process involves encapsulating the wireless communication device 10. The wireless communication device 10 is typically in the form of a RF integrated circuit chip that is encapsulated with a hardened, non-conductive material 130, such as a plastic or epoxy, to protect the inside components of the chip from the environment.

The eighth and last step involves winding wireless communication devices 10 as attached on the wave antenna 17 onto a reel 130. The wireless communication devices 10 and wave antenna 17 are contained on a strip since the wave antenna 17 conductor has not been yet cut. When it is desired to apply the wireless communication device 10 and attached wave antenna 17 to a good, object, or article of manufacture, such as a tire 50, the wireless communication device 10 and attached wave antenna 17 can be unwound from the reel 130 and the wave antenna 17 conductor cut in the middle between two consecutive wireless communication devices 10 to form separate wireless communication device 10 and dipole wave antenna 17 devices.

Figure 10:
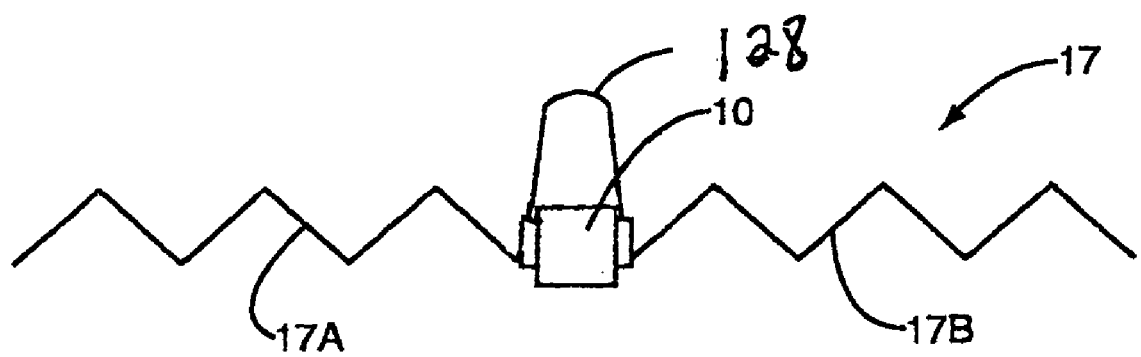
FIG. 10 is a schematic diagram of an inductance tuning short provided by the manufacturing process illustrated in FIG. 9.

FIG. 10 illustrates the short 128 left on the wireless communication device 10 and wave antenna 17 as a tuning inductance. Some UHF wireless communication devices 10 operate best when a direct current (DC) short, in the form of a tuning inductance, is present across the wireless communication device 10 and therefore the process of removing the short 128 can be omitted. FIG. 10 illustrates an alternative embodiment of the wave antenna 17 and wireless communication device 10 where an uneven cog 120 has been used in step 1 of the process to produce an extended loop short 128 across the wireless communication device 10. This gives the required amount of inductance for best operation of the wireless communication device 10 as the wave antenna 17 and the short 128 are in parallel.

The embodiments set forth above represent the necessary information to enable those skilled in the art to practice the invention and illustrate the best mode of practicing the invention. Upon reading the preceding description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

It should be understood that the present invention is not limited to applications involving a vehicle tire. It should also be understood that the present invention is not limited to any particular type of component, including but not limited to the wireless communication device 10 and its components, the interrogation reader 20 and its components, the pressure sensor 18, the temperature sensor 19, the resonating ring 40, the tire 50 and its components, the reporting system 77, the remote system 78, the wheel 100 and its components, the cogs 120, the soldering station 123, the adhesive 124, and the encapsulation material 130. For the purposes of this application, couple, coupled, or coupling is defined as either a direct connection or a reactive coupling. Reactive coupling is defined as either capacitive or inductive coupling.

Those skilled in the art will recognize improvements and modifications to the preferred embodiments of the present invention. All such improvements and modifications are considered within the scope of the concepts disclosed herein and the claims that follow.

What is claimed is:

1. An apparatus, comprising:
   a wireless communication device coupled to a wave antenna that operates at a first operating frequency and is comprised of at least one conductor that is bent in at least one position at an angle less than 180 degrees to form at least two different sections; and
   a tire wherein said wireless communication device is mounted to the inside of said tire and wherein said wireless communication device is adapted to wirelessly communicate information relating to said tire;
   wherein said tire comprises
      an outer surface, comprising a circular-shaped tread surface having a left outer side and a right outer side and an orifice, said left outer side and said right outer side each folding down at an angle to said tread surface to respectively form a left outer wall and a right outer wall and to respectively form a left inner wall and a right inner wall attached to an internal wall on the opposite side of said tread surface; and
   wherein said wireless communication device is attached to a wall inside said tire comprised from the group consisting of said left inner wall, said right inner wall, and said internal wall; and
   wherein said at least two different sections comprise a first section having a first length to form a first antenna designed to operate at a first operating frequency and a second section having a second length to form a second antenna designed to operate at a second operating frequency.

2. The apparatus of claim 1, wherein said tread surface is comprised of rubber, and wherein said wave antenna is contained inside said rubber.

3. The apparatus of claim 1, wherein said tread surface is comprised of rubber, and wherein said wireless communication device is contained inside said rubber.

4. The apparatus of claim 3, wherein said wave antenna is contained inside said rubber.

5. The apparatus of claim 3, wherein said tread surface contains an inner steel belt inside said rubber, and wherein said wave antenna is coupled to said inner steel belt.

6. The apparatus of claim 5, wherein said coupling of said wave antenna to said inner steel belt is comprised from the group consisting of direct coupling, capacitive coupling, and reactive coupling.

7. The apparatus of claim 6, wherein said wave antenna is contained inside said tread surface.

8. The apparatus of claim 6, wherein said wireless communication device is contained inside said tread surface.

9. The apparatus of claim 8, wherein said wave antenna is contained inside said tread surface.

10. The apparatus of claim 1, wherein said first section is coupled to said wireless communication device, and said second section is coupled to said first section.

11. The apparatus of claim 1, wherein said second section is bent into a plurality of subsections each having the same length to form said second antenna.

12. The apparatus of claim 1, wherein said first section is bent into a plurality of subsections each having the same length to form said first antenna.

13. The apparatus of claim 12, wherein said second section is bent into a plurality of subsections each having the same length to form said second antenna.

14. An apparatus, comprising:
   a wireless communication device coupled to a wave antenna that operates at a first operating frequency and is comprised of at least one conductor that is bent in at least one position at an angle less than 180 degrees to form at least two different sections;
   a tire wherein said wireless communication device is mounted to the inside of said tire and wherein said wireless communication device is adapted to wirelessly communicate information relating to said tire; and a resonating ring coupled to said wave antenna wherein said resonating ring forms a second antenna that operates at a second operating frequency.

15. The apparatus of claim 14, wherein said resonating ring is capacitively coupled to said wave antenna.

16. The apparatus of claim 15, wherein said resonating ring is additionally coupled to said wireless communication device so that the pressure placed on said wave antenna when inside said tire will be placed in whole or in part on said resonating ring to relieve mechanical stress on said wireless communication device.

17. The apparatus of claim 14, wherein said at least two different sections comprise a first section having a first length to form a first antenna designed to operate at a first operating frequency and a second section having a second length to form a second antenna designed to operate at a second operating frequency.

18. The apparatus of claim 17, wherein said first section is coupled to said wireless communication device, and said second section is coupled to said first section.

19. The apparatus of claim 17, wherein said second section is bent into a plurality of subsections each having the same length to form said second antenna.

20. The apparatus of claim 17, wherein said first section is bent into a plurality of subsections each having the same length to form said first antenna.

21. The apparatus of claim 20, wherein said second section is bent into a plurality of subsections each having the same length to form said second antenna.

22. A system for wirelessly communicating information about a tire, comprising:

an interrogation reader;

a wireless communication device coupled to a wave antenna that operates at a first frequency and is comprised of at least one conductor that is bent in at least one position at an angle less than 180 degrees to form at least two different sections;

a tire wherein said wireless communication device is mounted to the inside of said tire and wherein said wireless communication device is adapted to wirelessly communicate information relating to said tire to said interrogation reader; and a resonating ring coupled to said wave antenna wherein said resonating ring forms a second antenna that operates at a second operating frequency.

23. The system of claim 22, wherein said resonating ring is capacitively coupled to said wave antenna.

24. The system of claim 23, wherein said resonating ring is additionally coupled to said wireless communication device so that pressure placed on said wave antenna when inside said tire will be placed in whole or in part on said resonating ring to relieve mechanical stress on said wireless communication device.

25. The system of claim 22, wherein said at least two different sections comprise a first section having a first length to form a first antenna designed to operate at a first operating frequency and a second section having a second length to form a second antenna designed to operate at a second operating frequency.

26. The system of claim 25, wherein said first section is coupled to said wireless communication device, and said second section is coupled to said first section.

27. The system of claim 25, wherein said second section is bent into a plurality of subsections each having the same length to form said second antenna.

28. The system of claim 25, wherein said first section is bent into a plurality of subsections each having the same length to form said first antenna.

29. The system of claim 28, wherein said second section is bent into a plurality of subsections each having the same length to form said second antenna.

* * * * *